United States Patent
Blodgett, Jr.

(10) Patent No.: US 7,178,849 B1
(45) Date of Patent: Feb. 20, 2007

(54) LOCKING MECHANISM FOR RECREATIONAL VEHICLES

(75) Inventor: Raymond W. Blodgett, Jr., Norco, CA (US)

(73) Assignee: RBW Industries, Inc., Chino, CA (US)

( * ) Notice: Subject to any disclaimer, the term of this patent is extended or adjusted under 35 U.S.C. 154(b) by 27 days.

(21) Appl. No.: 10/845,736

(22) Filed: May 14, 2004

Related U.S. Application Data

(60) Provisional application No. 60/471,124, filed on May 16, 2003.

(51) Int. Cl.
*B60P 3/34* (2006.01)
(52) U.S. Cl. .................................. 296/26.12
(58) Field of Classification Search .............. 296/26.01, 296/165, 170, 171, 172, 173, 175, 176, 26.12–26.15
See application file for complete search history.

(56) References Cited

U.S. PATENT DOCUMENTS

| | | | |
|---|---|---|---|
| 3,106,750 A | | 10/1963 | Jarman |
| 5,491,933 A | | 2/1996 | Miller et al. |
| 5,577,351 A | | 11/1996 | Dewald et al. |
| 5,791,715 A | * | 8/1998 | Nebel ...................... 296/26.13 |
| 6,108,983 A | | 8/2000 | Dewald et al. |
| 6,293,611 B1 | | 9/2001 | Schneider et al. |
| 6,619,714 B2 | * | 9/2003 | Schneider et al. ........ 296/26.13 |
| 6,729,669 B2 | | 5/2004 | McManus et al. |
| 2002/0180232 A1 | * | 12/2002 | Schneider et al. ........ 296/26.01 |
| 2004/0174031 A1 | | 9/2004 | Rasmussen |

* cited by examiner

*Primary Examiner*—H Gutman
(74) *Attorney, Agent, or Firm*—Inskeep IP Group, Inc.

(57) ABSTRACT

In one embodiment, the present invention provides an upper locking device for a slide-out room which ensures a substantially tight seal is created at the upper portion of the slide-out room.

16 Claims, 4 Drawing Sheets

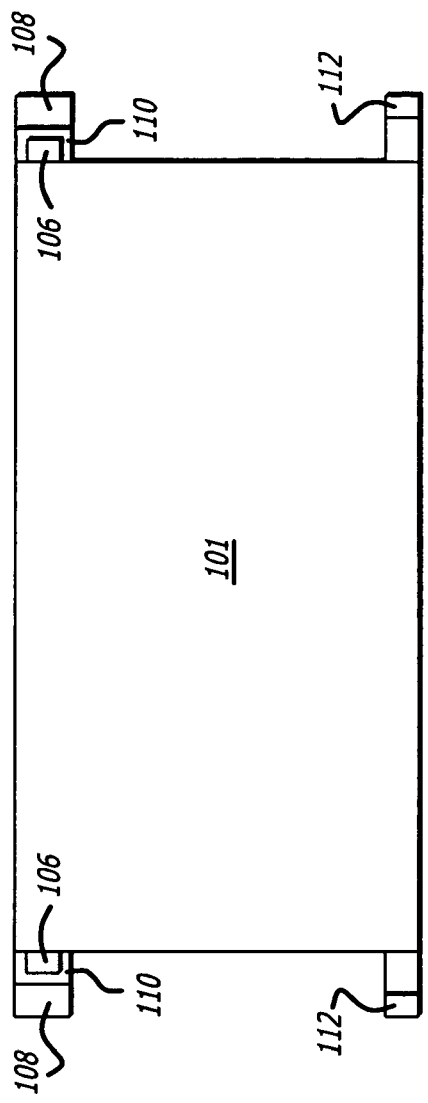
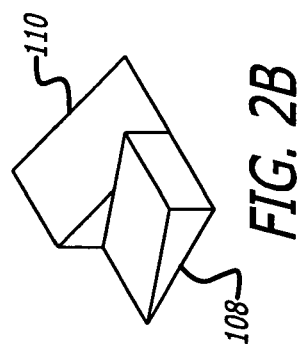
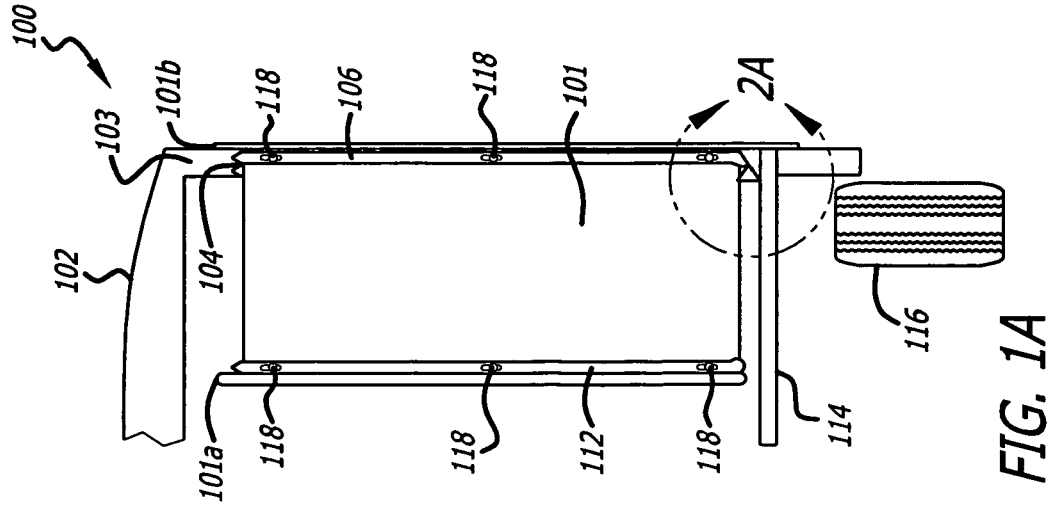
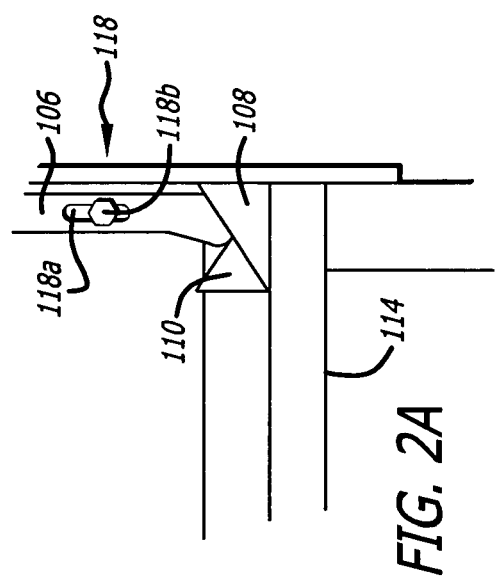

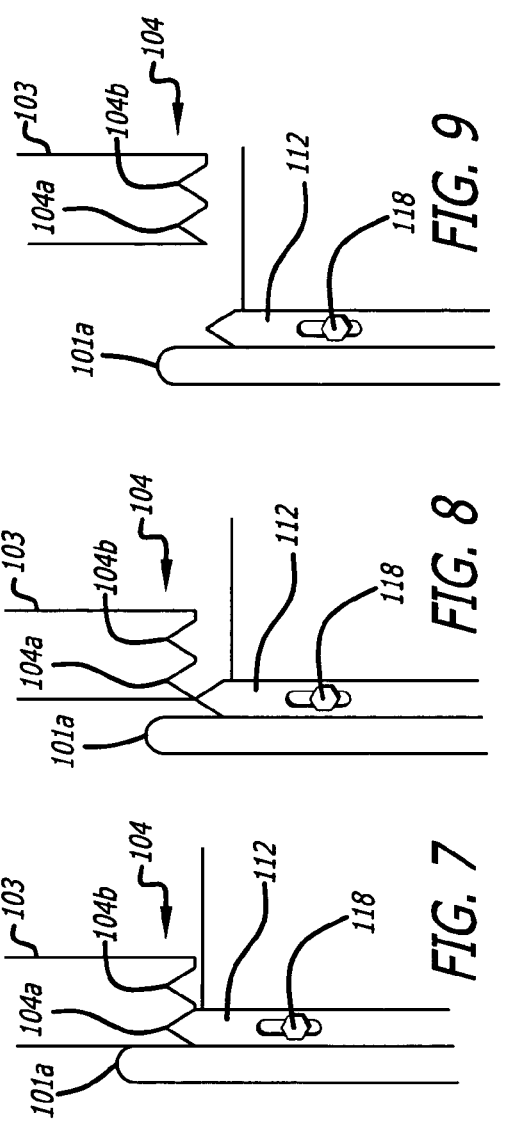
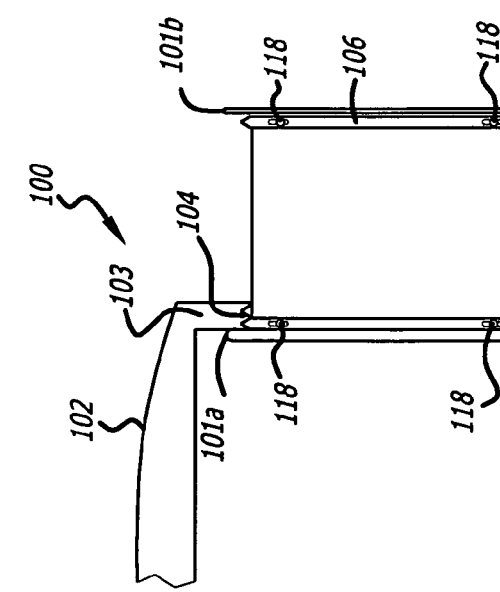
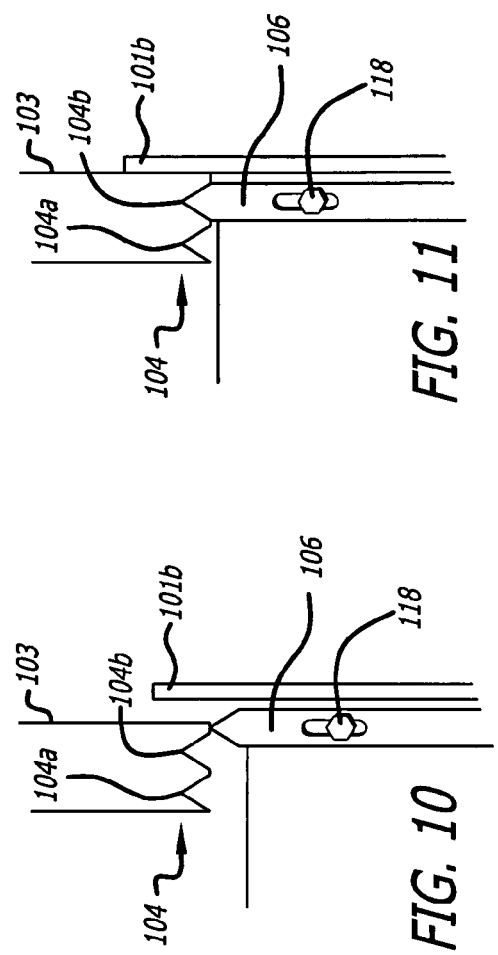

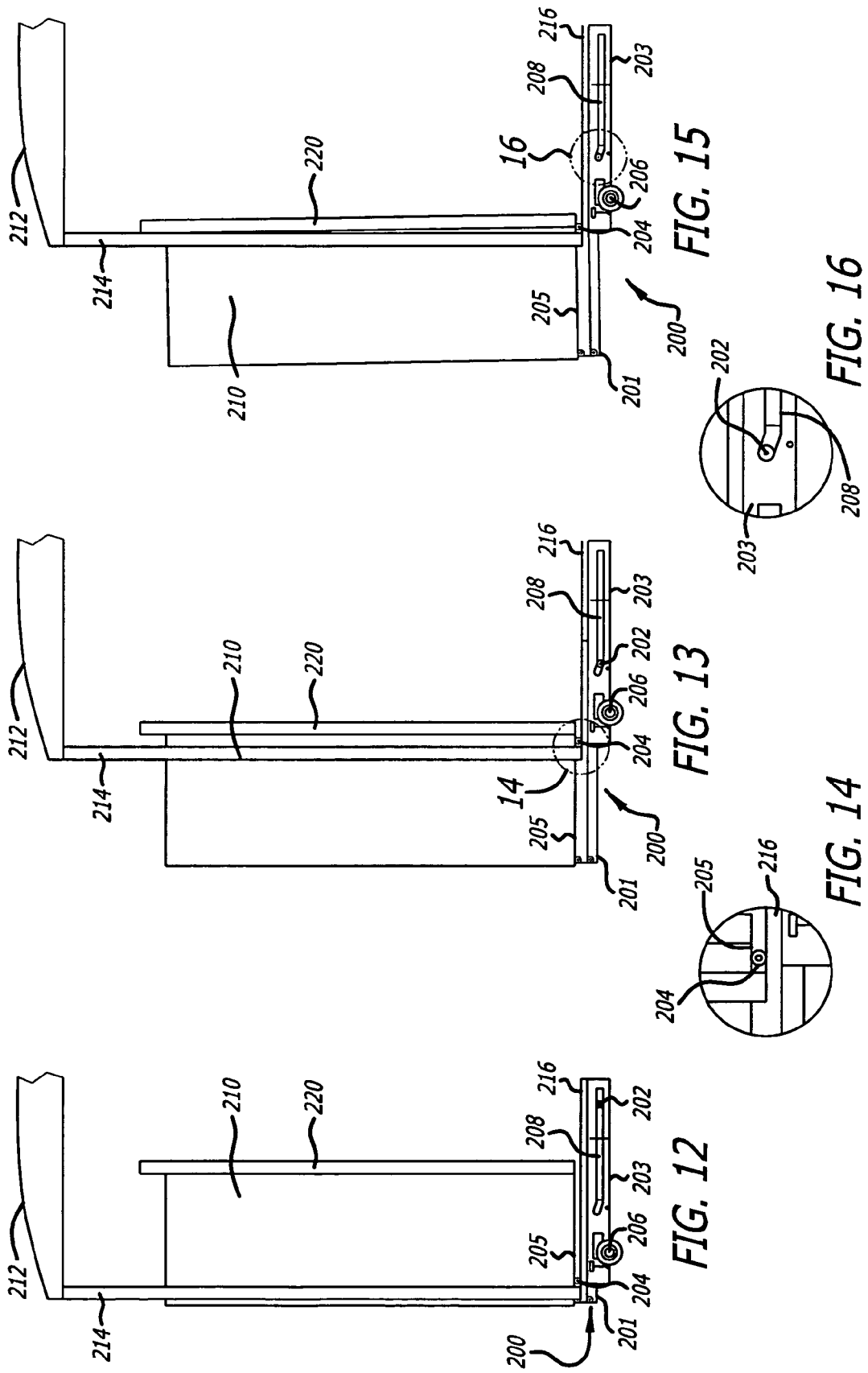

LOCKING MECHANISM FOR RECREATIONAL VEHICLES

CROSS REFERENCE TO RELATED APPLICATIONS

This application claims the benefit of U.S. Provisional Application 60/471,124, entitled Low Profile Slideout, filed May 16, 2003, the entire contents of which are hereby incorporated by reference.

BACKGROUND OF THE INVENTION

In order to increase the available interior space of a motorized or towable vehicle such as a motor home or trailer, slide-out rooms can be made integral with the vehicle. When the vehicle is in transit, the slide-out room can be retracted and stored in the vehicle's interior with the exterior wall of the slide-out room approximately flush with the vehicle's exterior. As such, there is typically adequate space within the vehicle's interior to accommodate users in transit and remain within the standard width limitations imposed upon a vehicle. When the vehicle is parked and leveled, the slide-out room is then slid outward through an opening formed in a sidewall of a fixed room, increasing the internal accommodations.

Typically, slide-out rooms usually include a floor section, a roof section, a first sidewall section, a second sidewall section, and a third sidewall section. In the retracted position, the roof section and the first and second sidewall section are concealed from exterior view, and the third sidewall section forms a portion of the vehicle's sidewall. At the same time, the floor section of the slide-out room typically rests above a floor section of a fixed room and may form a portion of the usable interior floor during vehicle transit. Similarly, the roof section of the slide-out room may define the interior ceiling of that part of the vehicle during transit. The proximal ends of the roof section, first sidewall section, and second sidewall section, include stop walls. As used herein, "proximal" refers to the portion towards the vehicle body and "distal" refers to the portion away from the vehicle body. The stop walls form a L-shaped configuration with the respective roof section, first sidewall section and second sidewall section. The stop walls engage the inner surface of a respective sidewall section of the fixed room when the slide-out room is fully extended, and thereby limit the travel of the slide-out room.

A number of slide-out extension mechanisms are currently used to extend and retract the slide-out room. Typically, a slide-out extension mechanism includes a pair of support rails which telescopically extend and retract from a pair of channels. The support rails are attached to the slide-out room and the channels are attached to the fixed portion of the vehicle, such as the fixed room, wherein the slide-out room retracts and extends with the retraction and extension of the support rails. The support rails may be driven hydraulically, pneumatically, electrically or various combinations thereof. In the fully extended position, the support rails extend outwardly in a cantilevered manner and support the slide-out room. The slide-out room is further supported by the stop walls abutting the inner surface of the respective sidewall section of the fixed room.

In order to prevent environmental contaminants from entering the vehicle, inner flanges are typically included to press against the vehicle sidewall. Thus, the flanges may seal the vehicle when the slide-out room is extended or retracted, however they may not always form a tight seal. Misalignment of the slide-out mechanism, extreme temperatures, and movement due to traveling are just a few circumstances that may prevent a slide-out room 101 from sealing with a vehicle. What is needed is a slide-out mechanism that creates a better seal between the slide-out room and the vehicle, preventing water, snow, wind and other elements from entering the vehicle.

OBJECTS AND SUMMARY OF THE INVENTION

It is an object of the present invention to overcome the limitations of the prior art.

It is a further object of the present invention to provide a slide-out mechanism that creates a better seal between a slide-out room and a vehicle, thereby preventing elements from enter the vehicle.

In one embodiment, the present invention provides an upper locking device for a slide-out room which ensures a substantially tight seal is created at the upper portion of the slide-out room. Sliding members are slidably fixed to the slide-out room, moving upward at various points to lock with locking grooves above the slide-out room, thus providing additional locking force.

BRIEF DESCRIPTION OF THE DRAWINGS

FIG. 1A illustrates a side view of a retracted slide-out room according to the present invention;

FIG. 1B illustrates a top view of the retracted slide-out room of FIG. 1A;

FIG. 2A illustrates a magnified view of area 2A in FIG. 1A;

FIG. 2B illustrates a perspective view of the ramps of FIG. 1A;

FIG. 6 illustrates a side view of the slide-out room of FIG. 1A;

FIG. 7 illustrates a side view of a slide-out lock of FIG. 1A;

FIG. 8 illustrates a side view of slide-out locks of FIG. 1A;

FIG. 9 illustrates a side view of slide-out locks of FIG. 1A;

FIG. 10 illustrates a side view of slide-out locks of FIG. 1A;

FIG. 11 illustrates a side view of slide-out locks of FIG. 1A;

FIG. 12 illustrates a side view of a slide-out mechanism according to the present invention;

FIG. 13 illustrates a side view of the slide-out mechanism of FIG. 12;

FIG. 14 illustrates a magnified view of area 14 of FIG. 13;

FIG. 15 illustrates a side view of the slide-out mechanism of FIG. 12; and

FIG. 16 illustrates a magnified view of area 16 of FIG. 15.

DETAILED DESCRIPTION OF THE INVENTION

Figure 3:
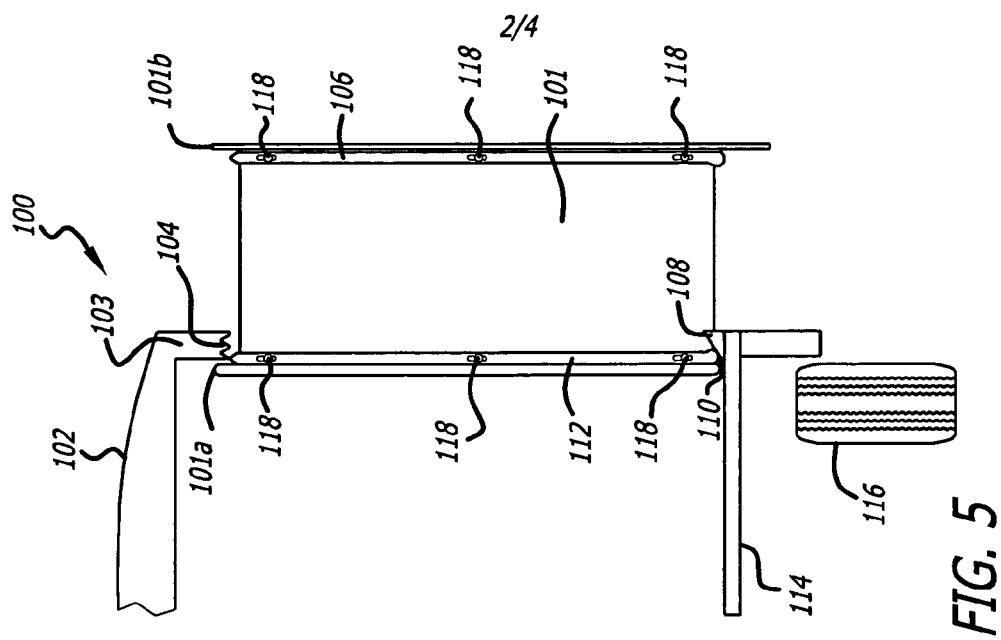
FIG. 3 illustrates a side view of the slide-out room of FIG. 1A.
Figure 4:
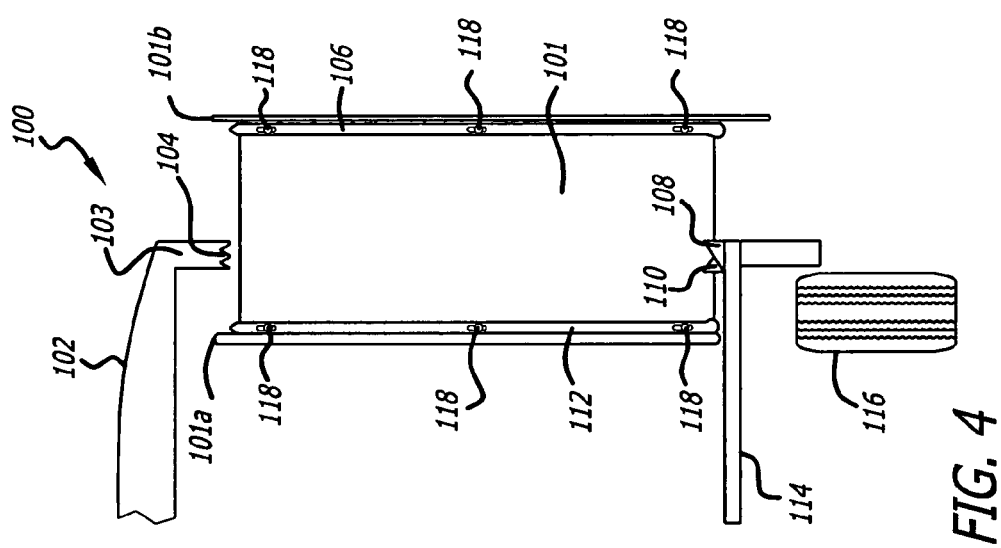
FIG. 4 illustrates a side view of the slide-out room of FIG. 1A.
Figure 5:
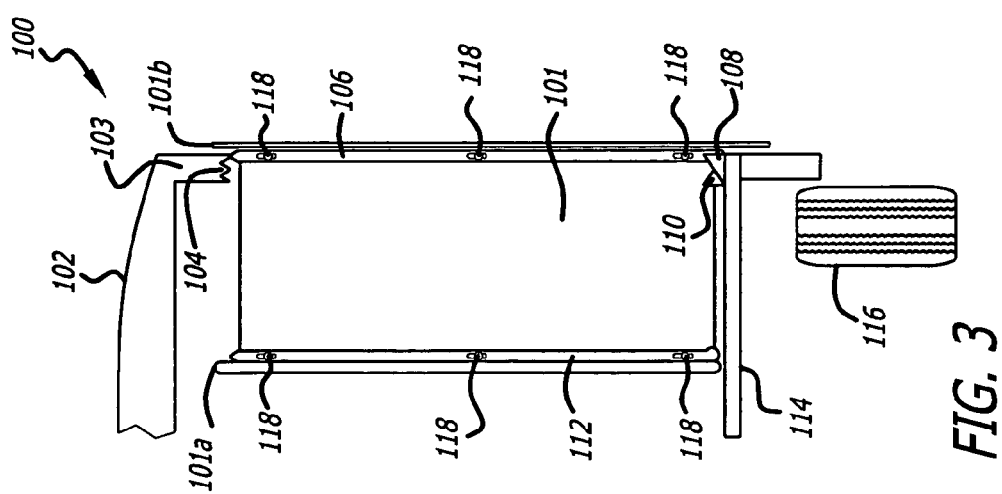
FIG. 5 illustrates a side view of the slide-out room of FIG. 1A.

The present invention provides locking or securing mechanisms for the slide-out room of a vehicle or trailer, ensuring that environmental contaminants such as dust and water do not enter the vehicle through the interface between the slide-out room and the sidewall of the vehicle.

Locking Seal

FIGS. 1A–11 illustrate a preferred embodiment of a slide-out lock 100 according to the present invention, with inner sliding members 112 and outer sliding members 106 which ride ramps 110 and 108 upward to lock with locking grooves 104. Since two sets of sliding members 106 and 112 may be used, a slide-out room 101 may be locked in both a fully extended or fully retracted position. In addition to maintaining a seal to exclude environmental contaminants into the vehicle, the slide-out lock 100 also functions to lock the slide-out room 101 in a retracted position, preventing slide-out room 101 movement or possibly accidental extension during travel.

The slide-out room 101 has a slide mechanism (not shown) that allows the slide-out room 101 to move to a retracted position above the floor 114, as seen in FIG. 1 or an extended position, as seen in FIG. 6. In order to prevent environmental contaminants from entering the vehicle, inner flange 101a and outer flange 101b are included to press against an upper sidewall 103, near a roof 102. Thus the inner flange 101a may seal the vehicle when the slide-out room 101 is extended while the outer flange 101b may seal the vehicle when the slide-out room 101 is retracted. However, these flanges 101a and 101b may not always form a tight seal. Misalignment of the slide-out mechanism, extreme temperatures, and movement due to traveling are just a few circumstances that may prevent a slide-out room 101 from sealing with a vehicle.

The present preferred embodiment locks the slide-out room 101 into either an extended sealed position or a retracted sealed position, preventing flange 101a or 101b from moving away from the upper sidewall 103. The slide-out room 101 is locked by way of two inner sliding members 112 or two outer sliding members 106 which move upward into locking grooves in the upper wall.

The inner sliding members 112 are positioned longitudinally on the outer wall of the slide-out room 101, near the opening to the main room. The outer sliding members 106 are positioned longitudinally along the outer wall of the slide-out room 101. Each sliding member 106 and 112 has three sliding fasteners 118 which hold the sliding members 106 and 112 against the slide-out room 101 while allowing them to slide longitudinally. The sliding fasteners 118 are composed of a slot 118a within the sliding members 106 and 112 and a fastening bolt 118b, fixed to the slide-out room 101. Thus, the length of the slot 118a accordingly governs the amount the sliding members 106 and 112 may slide up and down.

As best seen in FIG. 1B, the inner sliding member 112 and the outer sliding member 106 do not travel parallel to each other, but rather have two adjacent paths. These adjacent paths of travel allow the inner sliding member 112 to contact ramp 108 while allowing outer sliding member 106 to contact ramp 110. As preferably seen in FIGS. 2A and 2B, ramp 108 is inclined in a perpendicular direction away from the vehicle while ramp 106 is inclined in an opposite direction, toward the middle of the vehicle.

Preferably, compliant weatherproofing strips are fixed to either flange 101a or 101b, or to upper sidewall 103, creating a weatherproof seal between the slide-out room 101 and the sidewall 103. This allows the slide-out room 101 to prevent water, wind, and other elements from entering the vehicle.

The upper ends of sliding members 106 and 112 are preferably angled to facilitate engaging with locking grooves 104 recessed within the upper sidewall 103, as best seen in FIGS. 7–11. Due to the positions of the ramps 108 and 110, an inner locking groove 104a and an outer locking groove 104b are preferred.

In operation, the slide-out mechanism (not shown) retracts the slide-out room 101 within the vehicle. As seen in FIGS. 3 and 10, the outer sliding member 106 approaches the incline of ramp 110. As the slide-out mechanism continues to retract the slide-out room 101, the lower end of outer sliding member 106 begins to ride up the ramp 110. As the outer sliding member 106 moves against the ramp 110, it is urged upward to engage with outer locking groove 104b, thereby locking the upper portion of slide-out room 101 in place and preventing the slide-out room 101 from becoming unsealed between the outer flange 101b and the upper sidewall 103.

As the slide-out room 101 is expanded from the vehicle, the outer sliding member 106 moves down the ramp 110, disengaging the outer sliding member 106 from the outer locking groove 104b. As the slide-out room 101 becomes nearly fully extended, the inner sliding member 112 begins to ascend ramp 108, as seen best in FIGS. 5 and 7. As seen in FIGS. 6 and 7, once at the top of the ramp 108, the inner sliding member 112 engages with the inner locking groove 104a, thereby locking the upper portion of the slide-out room 101 in place, preventing the unsealing between the inner flange 101a and the upper sidewall 103.

In another preferred embodiment of the present invention, the sliding member 112 may be manually urged into either of the locking grooves 104a and 104b. The slide-out lock 100 may include a second locking mechanism to maintain the sliding member 112 in a locked position. For example, the sliding member 112 and vehicle body may have apertures to allow a locking pin to pass through both, thus temporarily and manually fixing the position of the sliding member 112.

In yet another preferred embodiment, the vertical position of the sliding member 112 may be remotely controlled via a motorized acme screw positioned at the lower end of the sliding member 112. Specifically, the motor and acme screw may be fixed within the sliding member 112, positioned to screw the acme screw into and out of the bottom of sliding member 112. Thus, by activating the motor, the sliding member 112 can be raised to a locking position or lowered to a non locking position. Motor activation may be manually actuated by an on/off switch or turned on by position switches which activate as the slide-out room 101 extends or retracts.

Alternatively, another preferred embodiment of the present invention may position the locking grooves within the floor and the ramps within the upper sidewall, with the sliding members positioned in an opposite longitudinal orientation. This "upside-down" embodiment is similar to the previously described embodiment, however the sliding members are biased upwards and pushed downwards to locking position.

In a further preferred embodiment, the sliding members may be positioned horizontally across the roof of the slide-out room, with appropriately positioned ramps and locking grooves, or in any other orientation to engage locking grooves within the RV body. Additionally, the slide-out lock could be "reversed", mounting the sliding members to the RV body so as to engage a ramp structure and locking groove within the slide-out room itself.

Slide-Out Seal

In yet another preferred embodiment illustrated in FIGS. 12–16, a sealing slide-out mechanism 200 provides fixed position rollers 204 and moving rollers 202 for controlling the position and angle of the slide-out room 210. In a fully extended position, the rollers 202 and 204 modify the angle of the slide-out room 210 to a create additional pressure on the top portion of flanged lip 220, creating a substantially tight seal between the slide-out room 210 and the vehicle wall 214.

Preferably, the sealing slide-out mechanism 200 utilizes a slide-out design similar to that disclosed in U.S. Pat. No. 6,702,353 entitled Remotely Actuated Brake For Slide-Out Mechanism, hereby incorporated by reference. That is, the sealing slide-out mechanism 200 is generally composed of a fixed outer tube 203 and an inner tube 201 that is telescopically mounted to the outer tube 203. The outer end of the inner tube 201 is coupled to the floor 205 of slide-out room 210.

The inner end of inner tube 201 includes tube rollers 202 that sit within a slot 208 located within the outer tube 203. As best seen in FIG. 16, the outer end of slot 208 is angled upward, allowing the tube roller 202 to follow the angled portion of the slot 208 to a relatively higher position.

The slide-out room floor 205 rests on stationary rollers 204 which are mounted to the main floor 216 of the vehicle. As the slide-out room 210 is moved from the retracted to the extended position, the stationary rollers 204 support and facilitate the movement of the slide-out room 210 with, for example motor 206.

Additionally, the slide-out room 210 has a flanged lip 220, located around the inner opening of the slide-out room 210. The flanged lip 220 extends out from the edge of slide-out room 210 to a greater size than the opening within the sidewall 214 for the slide-out room. Thus, when the slide-room 210 is fully extended, the flanged lips 220 press against the inner side of sidewall 214. Optionally, compliant sealing strips or weather proofing strips may be fixed to the flanged lip 220 or the inner side of the sidewall 214, creating a weatherproof seal.

In operation, the slide-out room 210 may start in a fully retracted position, as seen in FIG. 12. The motor 206 is activated, urging the inner tube 210 to begin moving outward from the vehicle, thus moving the slide-out room 210 outward from the vehicle, as seen in FIG. 13. Once the inner tube 201 and slide-out room 210 begin to reach a fully extended position, the tube roller 202 of inner tube 201 begins to ascent the upwardly angled portion of slot 208, effectively lifting the inner end and lowering the outer end of tube roller 201. In turn, the slide-out room 210 becomes similarly angled, as seen in FIG. 15, causing the top of the outer flanged lip 220 of the slide-out room 210 to press against an inner surface of the vehicle sidewall 214. Thus, by angling the slide-out room 210 against the sidewall 214, additional pressure may be directed toward the top of the slide-out room 210, creating a substantially tighter seal between the slide-out room 210 and the vehicle sidewall 214.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A slide-out room for a vehicle comprising:
   a stationary member mounted on said vehicle;
   a movable member slidably mounted to said stationary member;
   said slide-out room fixed to said movable member;
   a slot disposed in said stationary member;
   a guiding element fixed on said movable member and disposed in said slot such that movement of said movable member is directed by said slot through said guiding element; and
   said slot having a shape such that said guiding element causes said slide-out room to tilt in an extended position and thereby securely seal a top region of said slide-out room against said vehicle.

2. The slide-out room of claim 1 wherein said slot includes an upwardly angled portion.

3. The slide-out room of claim 2 wherein said upwardly angled portion is positioned at an outer end of said slot.

4. The slide-out room of claim 1 wherein said guiding element is a roller.

5. The slide-out room of claim 1 wherein said slide-out room includes a flange having a seal positioned to press against a side wall.

6. A slide-out system for a vehicle comprising:
   a vehicle;
   a first member fixed in a stationary position on said vehicle;
   a slide-out room disposed within said vehicle;
   a second member coupled to slide relative to said first member and having a first end fixed to said slide-out room;
   a slot having an elongated shape and being positioned within said vehicle;
   a slot member movable with said second member and disposed within said slot;
   wherein said slot is shaped to modify a height of said slot member and thereby modify an angular position of said slide-out room relative to said vehicle.

7. The slide-out system of claim 6 wherein said slot includes an upwardly angled region.

8. The slide-out system of claim 7 wherein said upwardly angled region is positioned at an end of said slot.

9. The slide-out system of claim 6 wherein said slot is positioned within said second member.

10. The slide-out system of claim 6 further comprising a flanged lip disposed around an outer edge of said slide-out room.

11. The slide-out system of claim 10 wherein said slot member is a roller.

12. The slide-out system of claim 6 wherein said slide-out room includes a flange having a seal positioned to press against a side wall of said vehicle.

13. A method for securely sealing a top region of a slide-out room comprising:
   providing a vehicle having a slide-out room disposed on a slide-out system to slide into and out of said vehicle, said slide-out system including a stationary member, a moving member and a guide member coupled to said moving member;
   moving said slide-out room relative to said vehicle;
   adjusting an angle of said slide-out room by moving said guide member within the length of a slot
   wherein said adjusting an angle of said slide-out room further comprises changing an elevation of said guide member.

14. The method of claim 13 further comprising providing an inner flange disposed on said slide-out room.

15. The method of claim 14 further comprising urging said inner flange against a wall of said vehicle.

16. The method of claim 14 wherein said slot is positioned within said stationary member.

* * * * *